Patented Oct. 9, 1934

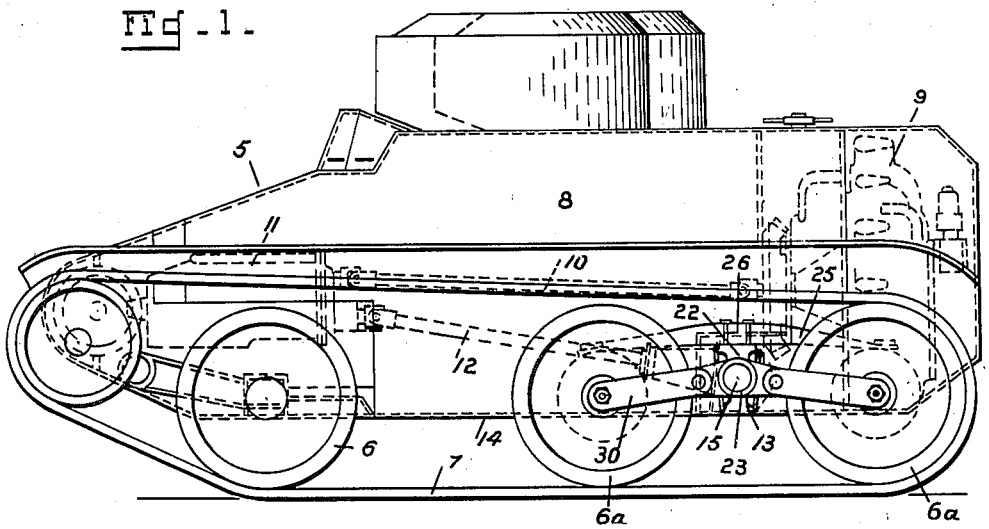

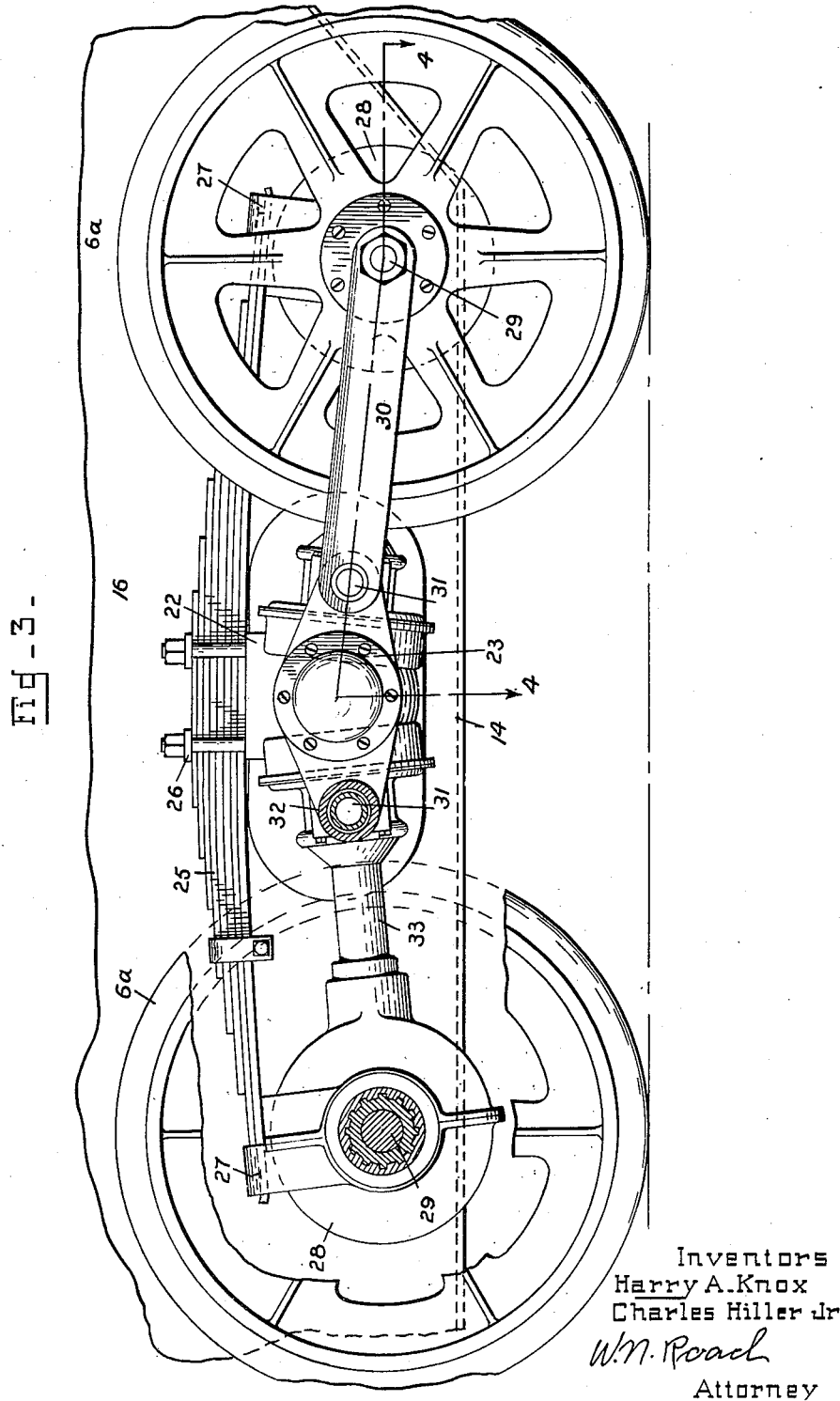

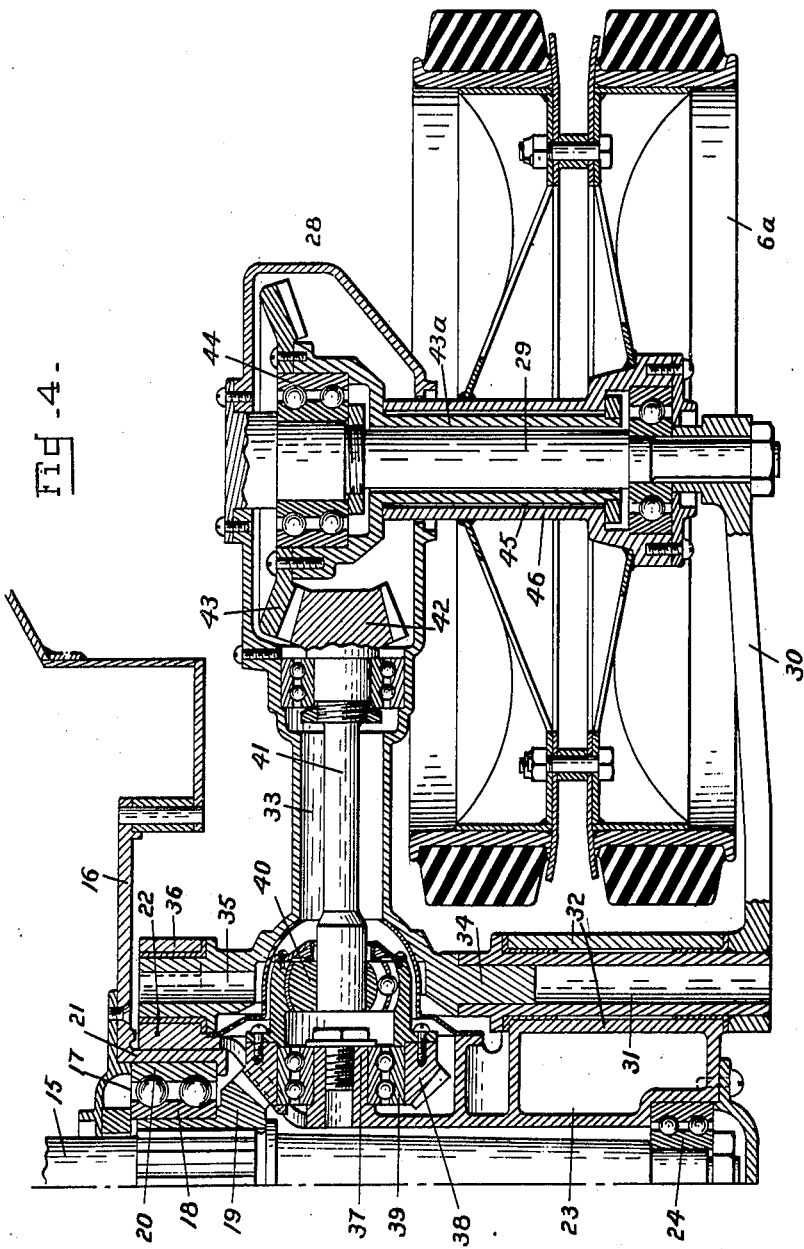

1,975,794

UNITED STATES PATENT OFFICE 1,975,794

SUSPENSION AND DRIVE FOR VEHICLES

Harry A. Knox, Davenport, Iowa, and Charles Hiller, Jr., St. Louis, Mo.

Application February 3, 1933, Serial No. 655,042

4 Claims. (Cl. 180—22)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a vehicle and more particularly it has reference to a suspension and drive for a four-wheel unit.

The principal object of the invention is to provide a vehicle in which each of the four rear driving wheels is mounted for independent vertical movement while at the same time the wheels on the same side are sprung from a centrally pivoted leaf spring and may be rocked as a unit.

A further object of the invention is to rigidly mount the driving axle in the frame of the vehicle so that the leaf springs on opposite sides of the vehicle will be independent of each other.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a view in side elevation of a vehicle constructed in accordance with the invention.

Fig. 2 is a diagrammatic view showing the power transmission.

Fig. 3 is a detail view partly in side elevation and partly in section of a suspension unit.

Fig. 4 is a detail sectional view on the line 4—4 of Fig. 3.

Referring to the drawings by numerals of reference:

There is shown a vehicle 5 which in the present instance is an armored car whose traction is afforded by means of the usual wheels 6—6a or by means of an endless track 7 trained about the wheels.

The body 8 encloses a power plant 9 from which a drive shaft 10 extends forwardly to a transmission mechanism 11. A drive shaft 12 extends rearwardly from the transmission mechanism and leads to a differential mechanism 13 whose housing may rest on the floor 14 of the body. Driven axles 15—15 extend laterally from opposite sides of the differential and each projects through the side wall 16 (Fig. 4) of the body. It is supported by the side wall through an anti-friction bearing 17 whose inner race 18 embraces the hub of a bevel gear 19 splined on the axle and whose outer race 20 is fitted in an annular flange 21 of the side wall 16.

A bracket 22 pivotally mounted on the annular flange 21 of the side wall includes a sleeve 23 housing the end portion of the axle 15 and mounted on the extremity thereof through an anti-friction bearing 24. The bracket forms a seat for a leaf spring 25 (Fig. 3) secured by clamps 26. The ends of the spring are associated with a pair of driving wheels 6a on the same side of the vehicle, each end being inserted in a socket 27 in the upper part of a housing 28 that is secured to the dead spindle 29 of each wheel (Fig. 4).

The pair of wheels are held against longitudinal displacement by means of a connection with the bracket and sleeve unit, the connection for each wheel comprising a pair of arms. One arm 30 is splined on the outer end of the spindle 29 and has a long hollow trunnion 31 secured thereto as by welding and disposed in a two part bearing 32 in the sleeve 23. The other arm 33 is constituted by a tubular housing forming part of the housing 28 and having coaxial trunnions 34 and 35, the former mounted in the hollow trunnion 31 and the latter disposed in a bearing 36 in the bracket 22.

The trunnions 31 (Fig. 3) pertaining to the pair of wheels are substantially 180 degrees apart relative to the axle 15 and each trunnion is normally positioned in the plane containing the axle 15 and spindle 29 and between these two members so that each wheel may be moved vertically about a pivot that is not coincident with the axle 15 which is the pivotal axis of the bracket and leaf spring.

The inner end of the sleeve 23 is formed with a pair of studs 37—37 only one being shown in Fig. 4 disposed perpendicular to the axis of the sleeve and axially of the tubular housings 33. A bevel gear 38 is mounted on each stud through an anti-friction bearing unit 39 and meshes with the bevel gear 19 splined on the axle 15. The gear 38 is mounted by means of a universal joint 40 on one end of a shaft 41 disposed in the tubular housing 33. A pinion 42 on the outer end of the shaft meshes with a bevel gear 43 disposed in the housing 28 and mounted through an anti-friction bearing 44 on the spindle 29. A sleeve 43a integral with the gear 43 has a splined connection 45 with the hub 46 of the wheel 6a whereby the wheel is driven.

The drive from the axle 15 to the pair of wheels 6a is diagrammatically illustrated in Fig. 2, the parts being correspondingly numbered.

In action each of the driven wheels 6a is free to move vertically, swinging about the trunnions of the arms 30 and 33, and deflecting the leaf spring. The associated pair of wheels on the same side of the vehicle may also be freely rotated as a unit by virtue of the pivotal mounting of the bracket 22 that seats the leaf spring. This rocking of a suspension unit on one side of the vehicle is independent of the suspension unit on the other side and consequently the leaf springs are not subject to a twisting action.

A further advantage gained by having the axles 15 non-resiliently mounted on the body is the ability to lower the floor 14 of the body. This is of particular importance in armored cars because the height of the vehicle may be kept at a minimum to reduce vulnerability. Furthermore in a cross-country vehicle the under side of the vehicle should be smooth to prevent entanglement and interference with obstructions.

We claim:

1. In a vehicle, a body having coaxial bearings, a drive axle extending through each bearing, a pinion on each drive axle mounted in one of the bearings, a bracket pivotally mounted on each of the bearings and including a sleeve mounted on the end of the drive axle, a wheel at each of the opposite sides of each axle and spaced therefrom, a leaf spring seated on the bracket and having its ends associated with the wheels, a spindle in each wheel, a pair of arms connecting each spindle of each wheel with the bracket and trunnioned in the bracket, the trunnions for the arms of the opposite wheels being substantially 180 degrees apart relative to the drive axle, a drive shaft in one of each pair of arms, a gear universally mounted on one end of each shaft and meshing with the gear on the axle, a pinion on the other end of said shaft, a gear meshing with said pinion and mounted on the spindle of each of the wheels, said gear having a driving connection with the wheel.

2. In a mounting and drive for a plurality of wheels at one side of a vehicle, a vehicle body, a drive axle non-resiliently carried by the body, a bracket mounted for pivotal movement about the axle, a wheel at opposite sides of the axle and spaced therefrom, a leaf spring seated on the bracket and having its ends associated with the wheels, a spindle in each wheel, a pair of arms connecting each spindle of each wheel with the bracket and trunnioned in the bracket, the trunnions for the arms of the opposite wheels being substantially 180 degrees apart relative to the drive axle, a drive shaft in one of each pair of arms, a gear universally carried on one end of said shaft and meshing with the gear on the axle, said gear supported on the bracket, a pinion on the other end of said shaft, a gear meshing with said pinion and mounted on the spindle of each of the wheels, said gear having a driving connection with the wheel.

3. In a mounting and drive for a plurality of wheels at one side of a vehicle, a vehicle body, a drive axle non-resiliently carried by the body and disposed transversely thereof, a bracket mounted for pivotal movement about the axle, a pair of wheels each at diametrically opposite sides of the axle and spaced therefrom, a leaf spring seated on the bracket and having its ends associated with the wheels, a pair of arms connecting each wheel with the bracket and having a pivot in the bracket between the wheel and axle, the pivots of the arms of the opposite wheels being substantially 180 degrees apart, a drive shaft in one of each pair of arms, a universal joint in each drive shaft its center of oscillation being a point in the axis of the pivot of the arm, a driving connection between one end of the shaft and the axle and a driving connection between the other end of the shaft and a wheel.

4. In a mounting and drive for a plurality of wheels at one side of a vehicle, a vehicle body, a drive axle non-resiliently carried by the body and disposed transversely thereof, a bracket mounted for pivotal movement about the axle, a pair of wheels each at diametrically opposite sides of the axle and spaced therefrom, a leaf spring seated on the bracket and having its ends engaging the wheels, a rigid member connecting each wheel with the bracket and having a pivot in the bracket between the wheel and axle, a drive shaft in the horizontal plane of each rigid member, a universal joint in each drive shaft its center of oscillation being a point in the axis of the pivot of the rigid member, a driving connection between one end of each shaft and the axle and a driving connection between the other end of each shaft and a wheel.

HARRY A. KNOX.
CHARLES HILLER, Jr.